United States Patent
Raby et al.

(10) Patent No.: US 9,412,210 B2
(45) Date of Patent: Aug. 9, 2016

(54) METHOD OF REPORTING RUNWAY CONDITION USING BRAKE CONTROL SYSTEM

(71) Applicant: Hydro-Aire, Inc., Burbank, CA (US)

(72) Inventors: Ronald Raby, Chatsworth, CA (US); John Gowan, Kirkland, WA (US); Gregg Duane Butterfield, Burbank, CA (US)

(73) Assignee: HYDRO-AIRE, INC., Burbank, CA (US)

( * ) Notice: Subject to any disclaimer, the term of this patent is extended or adjusted under 35 U.S.C. 154(b) by 0 days.

(21) Appl. No.: 14/636,826

(22) Filed: Mar. 3, 2015

(65) Prior Publication Data
US 2015/0254990 A1    Sep. 10, 2015

Related U.S. Application Data

(60) Provisional application No. 61/949,889, filed on Mar. 7, 2014.

(51) Int. Cl.
| | |
|---|---|
| G06F 19/00 | (2011.01) |
| G07C 5/08 | (2006.01) |
| B64C 25/42 | (2006.01) |
| B64C 25/46 | (2006.01) |
| B60T 8/17 | (2006.01) |
| B60T 8/172 | (2006.01) |
| G08G 5/00 | (2006.01) |
| G08G 5/02 | (2006.01) |

(52) U.S. Cl.
CPC ............... *G07C 5/0841* (2013.01); *B60T 8/172* (2013.01); *B60T 8/1703* (2013.01); *B64C 25/426* (2013.01); *B64C 25/46* (2013.01); *G08G 5/0013* (2013.01); *G08G 5/0091* (2013.01); *G08G 5/025* (2013.01); *B60T 2210/13* (2013.01)

(58) Field of Classification Search
None
See application file for complete search history.

(56) References Cited

U.S. PATENT DOCUMENTS

| | | |
|---|---|---|
| 8,116,989 B2 | 2/2012 | Journade et al. |
| 8,738,201 B2 | 5/2014 | Edwards et al. |
| 2009/0125169 A1* | 5/2009 | Edwards .............. G08G 5/0013 701/16 |
| 2011/0144875 A1 | 6/2011 | Rado |
| 2013/0184904 A1 | 7/2013 | Gadzinski |
| 2015/0120098 A1* | 4/2015 | Catalfamo ............... G08G 5/02 701/16 |

OTHER PUBLICATIONS

International Search Report, May 12, 2015, 3 pages, from PCT/US2015/019234, published as WO 2015/134898 on Sep. 11, 2015.

\* cited by examiner

*Primary Examiner* — Adam Alharbi
(74) *Attorney, Agent, or Firm* — Fulwider Patton LLP

(57) ABSTRACT

A system and method for objectively evaluating an airport runway condition, where conditions pertaining to aircraft landing factors are compiled and used to determine a runway braking condition. One set of conditions pertains to aircraft landing factors, including brake metered pressure, wheel speed, and aircraft deceleration, and a second set of factors relate to pilot controlled parameters. A condition report is generated and made available to pilots of subsequently landing aircrafts prior to landing.

16 Claims, 3 Drawing Sheets

METHOD OF REPORTING RUNWAY CONDITION USING BRAKE CONTROL SYSTEM

BACKGROUND

While aircraft travel is considered among the safest modes of transportation, there are elements of air travel that remain a challenge. One of the most critical aspects of travel by aircraft is the landing, and more particularly, landing in inclement weather. Each year there are numerous cases of commercial aircraft landing or taxiing in poor weather conditions on runways affected by adverse runway conditions and having issues with the landing or control of the aircraft. A major contributor to these events is difficulty for the pilot to establish enough braking friction on wet or frozen wheels/runways to safely bring the aircraft to a controlled stop. This can lead to overrunning of the runway or other hazardous situations that are perilous for the aircraft and/or the passengers.

A current method for evaluating unfavorable runway conditions is for the pilots to communicate their subjectively perceived evaluations of the runway conditions based on feel and feedback from the aircraft after landing on the runway itself. This information is gathered by the controllers in the tower, who then make a general assessment of the landing risks for subsequent aircraft. Since these evaluations are entirely subjective and based on pilot evaluating, these subjective criteria often vary from pilot to pilot and can be unreliable for various reasons, including a pilot not wanting to admit that a landing was challenging or risky.

There is a need in the art for a more objective determination of the landing conditions on a runway at a particular location in inclement weather. While there are various methods in place that attempt to determine and communicate runway temperatures, moisture, humidity, etc., the present invention uses data from the aircraft brake control/anti-skid autobrake system to determine a developed braking effectiveness. The monitors within the brake control system can generate an objective runway condition report, based on braking conditions, that can be communicated to the flight deck or to an on-board monitoring system which forwards all of the information to controllers and subsequent flight crews.

SUMMARY OF THE INVENTION

The present invention is a method and system for evaluating the conditions for the landing of an aircraft based on determinations made by a history of landing based on the aircraft braking system, where such aircraft braking system data and determinations are supplied to a tower or warning system so that a more comprehensive and objective method of determining the runway conditions can be formulated. The invention uses various sensors within the braking system, including antiskid measurements, to evaluate the conditions on the runway. The data can be collected and forwarded to subsequent flights to ensure a safer landing environment for subsequent flights.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
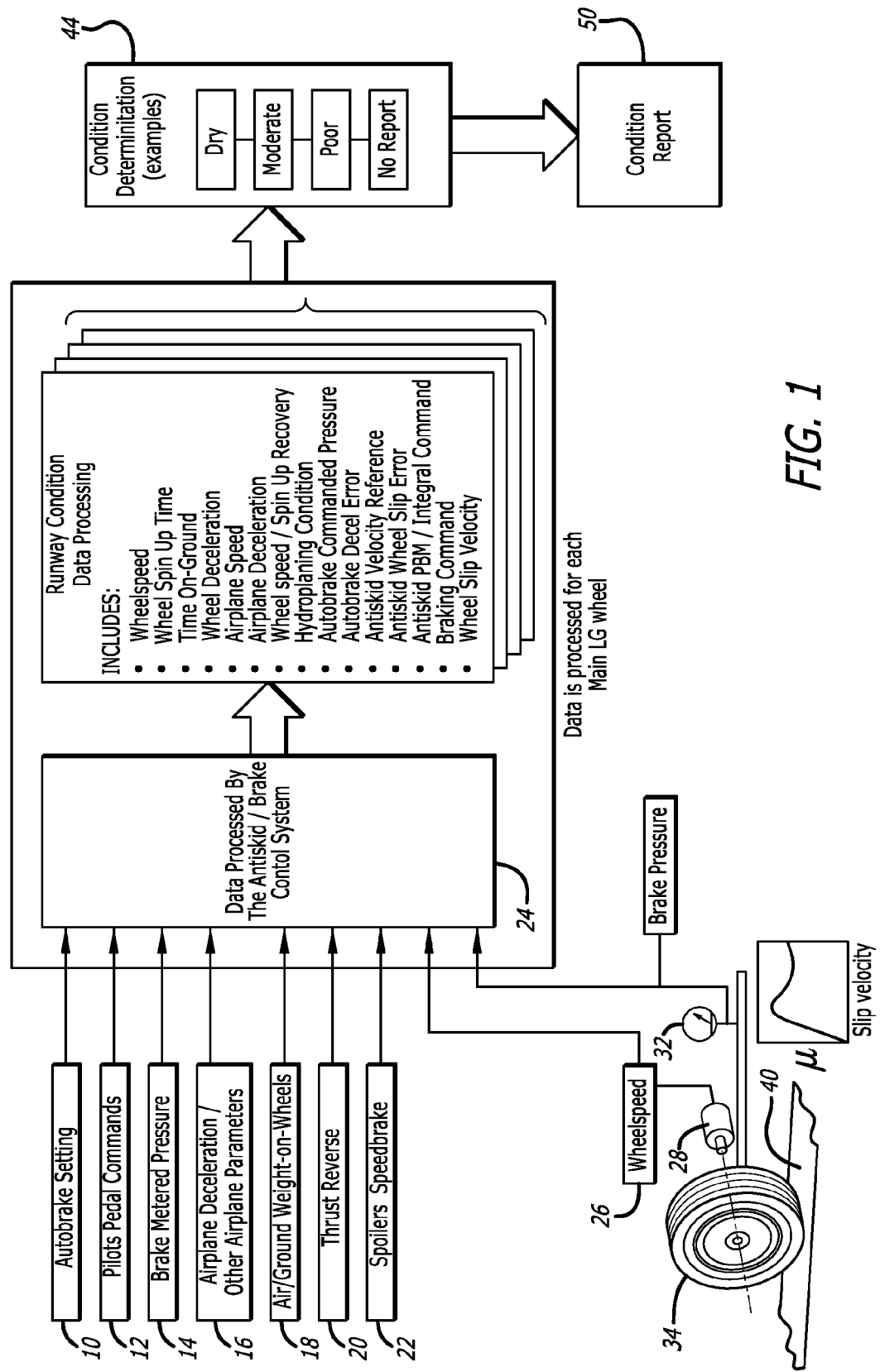
FIG. 1 is a schematic diagram showing the inputs to the present invention.

FIG. 1 illustrates a schematic diagram of the inputs that may be collected for objectively assessing a landing condition in the present invention. A processor may be used to collect, process, and store data using a computer program of the present invention, where input from each wheel in the landing gear is provided to the program. The program outputs a condition report that may be stored, broadcasted, or otherwise made available to subsequently landing aircraft at the same runway. Other modes can be implemented to carry out the invention without a computer program, and the invention is not limited to just a computer program.

Input to the program may include the following: the autobrake setting 10 from the cockpit, the pilot's pedal commands 12 from the cockpit, the brake metered pressure 14 from a sensor, the aircraft deceleration 16 along with other various parameters such as inertial reference system ground speed, weight on wheels 18, etc.; thrust reverse value 20, and spoiler/speedbrake deployment 22. Each of these inputs are fed to the anti-skid/brake control system 24, along with the actual wheel speed 26 taken at the axle wheelspeed transducer 28 and the brake pressure 30 using a pressure transducer 32 (if available) at the wheel 34. Each of these factors are used to evaluate a braking quality factor of the tire-runway interface 40.

In a first preferred embodiment, a processor in the anti-skid/brake control system 24 receives all of the data and undertakes a data processing program that incorporates:

(a) wheel speed
(b) wheel spin-up time
(c) time on ground
(d) wheel deceleration
(e) aircraft ground speed
(f) aircraft deceleration
(g) wheel speed spin-up recovery
(h) hydroplaning condition
(i) autobrake commanded pressure
(j) autobrake deceleration error
(k) anti-skid wheel slip error
(l) anti-skid velocity reference
(m) anti-skid PBM/Integral Command
(n) Braking command; and
(o) wheel slip velocity.

Each of these various factors are analyzed to arrive at a braking quality factor of the runway condition determination 44, which may be "DRY," "MODERATE," "POOR," or no report is made available. Other conditions are also possible, such as "GOOD," 'SATISFACTORY," "HAZARDOUS," and "INSUFFICIENT DATA." The ultimate condition is compiled in a condition report 50, which may be made available to subsequent pilots landing on the same runway, as well as kept for future analysis. In this way, a more objective approach to runway landing conditions is available to the pilots. The terms described in the condition report may be replaced or modified with synonymous terms or numerical representation. In other words, the outcome can be tailored based on the needs users' community or the specific reporting system. It is possible that in the future an industry or regulatory agency will adopt standard terms for describing tire/runway friction, and the present invention would incorporate those terms for reporting to the aircraft information system.

One advantage of the present invention is that all of the data used to determine the braking condition can be taken from the aircraft's brake control system. The determination of the runway condition can be used with either autobraking or pedal braking, where each option uses a separate branch to evaluate the braking surface. In one embodiment, the runway condition is determined during the landing roll, such as immediately after landing when the wheels spin up, and throughout various phases during the deceleration of the aircraft (e.g., at 100 kts groundspeed, 75 kts, 50 kts, etc.). The determination of the braking conditions evaluates whether autobrake or maximum brake pressure is employed, partial brake pressure employed, and if hydroplaning is occurring. In a preferred embodiment, all of the wheels in the landing gear are evaluated using the techniques referenced herein to better evaluate the conditions on the runway surface.

Figure 2A:
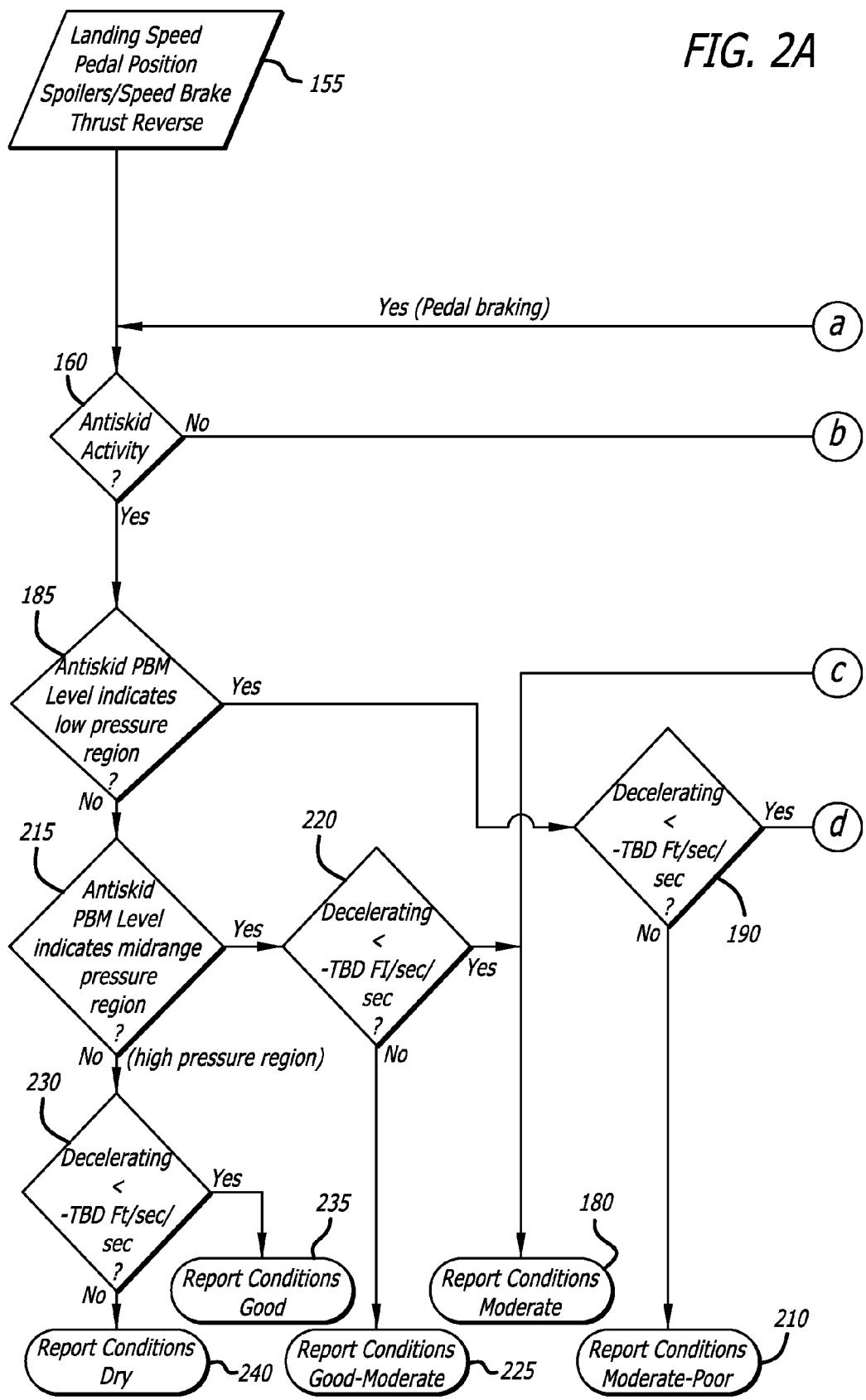
FIGS. 2A and 2B illustrate is a flow chart of a first embodiment of the method of the present invention.
Figure 2B:
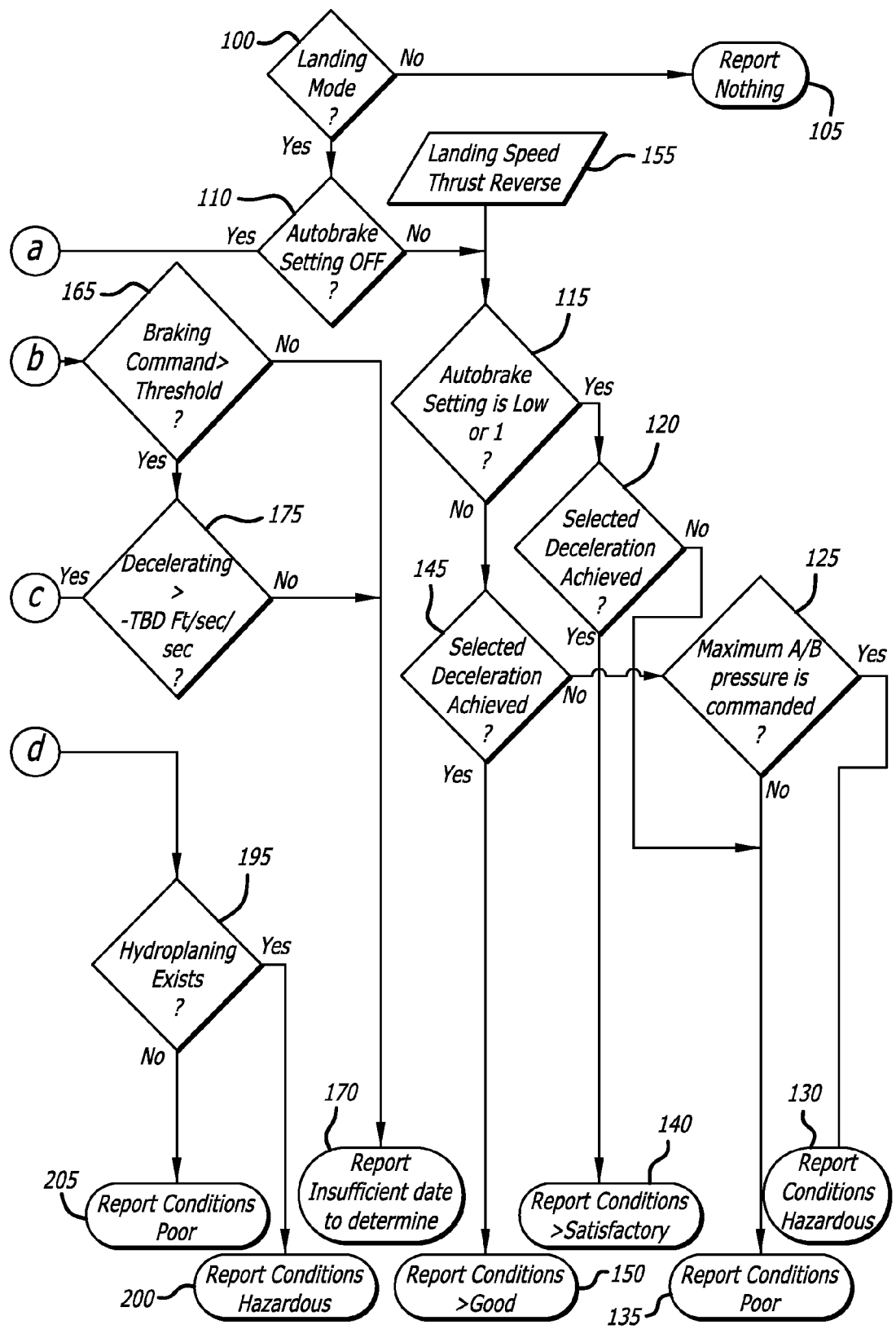

The method of the present invention can best be understood by reference to the flow chart illustrated in FIGS. 2A, 2B. The method is preferably performed by an onboard processor on the aircraft that includes a communication device that communicates the conditions on the runway to a remote location, such as a control tower, flight deck, or other central database. The flow chart goes through various decisions that ultimately determine if a condition is reported, and if so, the nature of the condition.

The first decision in diamond 100 is whether the aircraft is in landing mode. If the aircraft is not in landing mode, the program is inactive and reports nothing in bubble 105. If the aircraft is in landing mode, the next decision is whether the autobrake setting is OFF in diamond 110. If the aircraft's autobrake setting is not OFF, this means that the autobrake is active and the next decision is in diamond 115 to determine if the autobrake setting is LOW or "1." This query is based on the landing speed thrust reverse, which is provided in box 155. If the autobrake setting is not "LOW" or "1," the selected deceleration is evaluated in diamond 145. If the selected deceleration is achieved, the program reports that conditions are "GOOD" to the tower in bubble 150. If the selected deceleration is not achieved, if the maximum pressure commanded the program reports that the conditions are "HAZARDOUS" in bubble 130, and if the maximum pressure is not commanded the program reports that the conditions are "POOR" in bubble 135. If the autobrake setting is set to LOW or 1, the program determines if the selected deceleration is achieved under these settings in diamond 120. If yes, the program reports that conditions are "SATISFACTORY" in bubble 140. If the selected deceleration is not achieved, the program reports that the conditions were "POOR" in bubble 135.

If at the decision diamond 110 the autobrake setting is OFF, the landing speed, pedal position, spoilers, and reverse thrusters are activated or entered into the program in box 155. This information is passed to a decision diamond 160 where the program queries whether there is antiskid activity. If there is no antiskid activity, the program determines whether the braking command is greater than the braking threshold in diamond 165. If it is not, the program is unable to determine a condition and reports in bubble 170 that there is insufficient data to evaluate the conditions. If the braking command is greater than the braking threshold, the program seeks to determine in diamond 175 whether the aircraft's deceleration is greater than a predetermined value in feet per second squared. If the deceleration is not greater than the predetermined threshold, the program reports in bubble 170 that there is insufficient data to evaluate the landing conditions. However, if the program determines that the deceleration is greater than the predetermined value, the program reports in bubble 180 that the conditions are "GOOD-MODERATE."

If the program determines in diamond 160 that there is antiskid activity, then the program evaluates whether the antiskid PBM indicates a low pressure region in diamond 185. If the PBM indicates a low pressure region, the program again seeks to determine if the deceleration is less than a predetermined value in diamond 190. If the deceleration is not less than a predetermined value, the program reports that conditions are "MODERATE-POOR" in bubble 210. If the program determines that the deceleration is less than a predetermined value, the program next seeks to determine if a hydroplaning condition exists in diamond 195. If hydroplaning does not exist, the program reports in bubble 205 that the conditions are "POOR." If hydroplaning does exist, the program reports in bubble 200 that conditions are "HAZARDOUS."

If the program in diamond 185 determines that the PBM does not indicate a low pressure region, the program in diamond 215 evaluates whether the PBM indicates a mid-range pressure region. If the PBM does indicate a mid-range pressure region, the program in diamond 220 determines whether the deceleration is below a predetermined value in diamond 220. If the aircraft's deceleration is not less than the predetermined value, the program reports that the conditions are "GOOD-MODERATE" in bubble 225. If the deceleration is less than the predetermined value, the program reports in bubble 180 that the landing conditions are "MODERATE."

If the program does not determine that the PBM level indicates a mid-range pressure region in diamond 215, then the pressure region must be high. The program then makes a determination in diamond 230 whether the deceleration is less than a predetermined value. If the aircraft's deceleration is not less than the predetermined value, the program reports that the conditions are "DRY" in bubble 240. If the program determines that the deceleration is less than the predetermined value, the program reports in bubble 235 that the conditions are "GOOD."

The foregoing flow chart illustrates how a program can evaluate readings from various landing gear data and instruments to make a scaled evaluation of the available tire/runway friction conditions for a particular runway that is not subjective to the pilot but rather objectively determined. Other factors may be added to the calculus to arrive at more quantitative scores, but the foregoing example still provides excellent feedback to subsequent aircraft regarding the conditions on the approaching runway. Moreover, because the factors that go into the reporting are not subjective, pilots will gain further confidence and understanding of the various terms such as "GOOD" or "MODERATE" since they will be consistent each time the pilot lands. In this way, the present invention is a significant improvement over other systems for determining landing conditions on an aircraft runway.

The program described in the flow chart is but one example of the types of factors that can be considered in such a landing conditions reporting system. Other factors may also be used or combined into an even more comprehensive program. For example the program can also incorporate the rate of wheel spin-up from the Brake Control Antiskid System (wheel acceleration) to determine if the aircraft is in landing mode or take off mode. The program may also consider the rate of wheel spin-up (wheel acceleration) for each wheel when in landing mode, at initial aircraft touchdown, as an initial indication of runway friction and runway condition. This data can be incorporated into the final evaluation of the landing conditions as well. The program may also use data from the Brake Control Antiskid Systems autobrake function when it is the method chosen over manual braking, or use autobrake commanded pressure and deceleration setting as criteria for determining runway condition.

Additional embodiments of the present invention can use data from the Brake Control Antiskid System when manual braking is applied by the pilot or first officer, and where the system distinguishes if antiskid activity is present or not. When braking is insufficient to produce antiskid activity, the system may use aircraft generated deceleration reference or brake control system (wheel speed) generated deceleration to determine sufficient braking deceleration is achieved. Alternatively, when braking is sufficient to produce antiskid activity, the system may use antiskid brake control command integrator/pressure bias modulation (PBM) and/or brake pressure feedback to determine if braking activity is in a low pressure region.

Other factors may also influence the determination of the landing conditions. For example, when braking is sufficient to produce antiskid activity the system may use antiskid brake control determined wheel slip velocity and wheel slip error as an indication of runway condition, or the program may use the rate of wheel spin-up (wheel acceleration) during skid recovery as an indicator of runway condition. The program could also use an antiskid/brake control command and aircraft deceleration as criteria for determining runway condition. A comparison can be made as to the aircraft deceleration with wheel speed to determine if individual wheel hydroplaning conditions exist. The system then uses a hydroplane condition as a criteria for determining the braking quality factor. Other factors that may be incorporated into the program include inputs such as landing speed, brake pedal position or pilots metered brake pressure and ground spoiler handle position and thrust lever actuation as additional criteria for determining runway condition. The system may also conduct an initial evaluation and reporting of condition upon touchdown, as well as periodic evaluation and reporting of condition throughout the landing roll. Additionally, the program may compare its inputs with time phased profiles representative of the landing conditions to dynamically determine runway condition throughout the landing roll, and evaluate information from each main landing gear wheel channel to establish the overall runway condition being reported.

It will be apparent from the foregoing that while particular forms of the invention have been illustrated and described, various modifications can be made without departing from the spirit and scope of the present invention. Accordingly, it is not intended that the invention be limited but rather all modifications and substitutions that would be recognized by one of ordinary skill in the art are intended to be included in the scope of the invention.

We claim:

1. A method for objectively evaluating an airport runway condition, comprising:
   determining a first set of conditions pertaining to aircraft landing factors which are controlled by a pilot, including autobrake setting, brake metered pressure, thrust reverse, thrust lever position and ground spoilers;
   measuring a second set of conditions pertaining to aircraft braking factors, including brake pressure, wheel speed, and aircraft deceleration;
   determining a third set of conditions generated by an antiskid control system;
   processing the first, second, and third set of conditions to calculate a braking quality factor for the aircraft based on all three sets of conditions;
   assigning a runway condition based on the braking quality factor;
   generating a condition report from the braking quality factor and the associated data; and
   making available the condition report to pilots of subsequently landing aircrafts aircraft prior to landing.

2. The method for objectively evaluating an airport runway condition of claim 1, wherein a processor runs a computer program that receives input from the anti-skid brake control system and determines a braking quality factor based on the inputs.

3. The method for objectively evaluating an airport runway condition of claim 1, wherein a wheelspeed is measured directly from a sensor on the aircraft axle and used to determine the braking quality factor.

4. The method for objectively evaluating an airport runway condition of claim 1, wherein information from each braked wheel is used to determine the braking quality factor.

5. The method for objectively evaluating an airport runway condition of claim 1, wherein the first set of conditions includes a pilot's brake pedal commands.

6. The method for objectively evaluating an airport runway condition of claim 1, wherein the second set of conditions includes the aircraft's deceleration.

7. The method for objectively evaluating an airport runway condition of claim 1, wherein the brake control system includes an onboard processor that generates the condition report and makes the condition report available to a remote location.

8. The method for objectively evaluating an airport runway condition of claim 1, wherein a condition report is affected by whether a hydroplaning condition is present on the runway.

9. The method for objectively evaluating an airport runway condition of claim 1, wherein the second set of conditions includes a rate of wheel spin-up from the brake control antiskid system for each wheel.

10. The method for objectively evaluating an airport runway condition of claim 1, wherein a rate of wheel recovery measured by the antiskid system is included in the determination of runway condition.

11. The method for objectively evaluating an airport runway condition of claim 1, wherein a magnitude of slip error measured by the antiskid system is included in the determination of runway condition.

12. The method for objectively evaluating an airport runway condition of claim 1, where a quantity of skids measured by the antiskid system is included in the determination of runway condition.

13. A system for objectively evaluating an airport runway condition, comprising:
   a brake control/antiskid system including a transducer for measuring wheel speed of an aircraft landing gear;
   a pressure sensor for measuring a brake pressure of an aircraft landing gear;
   an accelerometer for measuring an aircraft deceleration during braking;
   a processor for receiving the measured wheel speed, applied brake pressure, brake metered pressure, thrust reverse, and measured aircraft deceleration, and generating a runway braking quality factor based on the input and a status of the aircraft, the status including weight on-wheels, autobrake setting, pilot brake pedal commands, braking commands, and antiskid control factors from the antiskid control system;
   said processor further comprising an indicator of thrust lever deployment wherein said processor uses a thrust lever position in said brake quality factor determination; and a report generated by the processor for evaluating a braking quality factor based on the input to the processor.

14. The system for objectively evaluating an airport runway condition of claim 13, further comprising a monitor indicator of spoiler deployment, and wherein the processor uses the spoiler deployment in the brake quality factor determination.

15. The system for objectively evaluating an airport runway condition of claim 13, wherein the processor is onboard the aircraft.

16. The system for objectively evaluating an airport runway condition of claim 13, wherein the information is derived from the brake control system of the aircraft.

\* \* \* \* \*